United States Patent
Hart et al.

[15] 3,699,424
[45] Oct. 17, 1972

[54] OVERVOLTAGE PROTECTION OF DC TO DC CONVERTERS USING FERRORESONANCE

[72] Inventors: Harry Patrick Hart, Whippany; Robert John Kakalec, Madison; Ralph Walk, Parsippany, all of N.J.

[73] Assignee: Bell Telephone Laboratories, Incorporated, Murray Hill, N.J.

[22] Filed: July 6, 1971

[21] Appl. No.: 159,793

[52] U.S. Cl. ................................. 321/11, 321/45 R
[51] Int. Cl. ............................................. H02m 7/48
[58] Field of Search ........................... 321/11, 45 R

[56] References Cited
UNITED STATES PATENTS
3,590,362 6/1971 Kakalec .................. 321/45 R

*Primary Examiner*—William M. Shoop, Jr.
*Attorney*—R. J. Guenther et al.

[57] ABSTRACT

The frequency characteristic of a ferroresonant regulator is shown to have a critical jump frequency above which the output voltage of the regulator takes a sudden drop. A regulated voltage converter utilizes this discontinuity to provide automatic overvoltage protection. An inverter drives a ferroresonant regulator and a feedback loop controls the frequency of the inverter in response to output voltage. A short in the feedback loop drives the frequency above the critical jump frequency to provide automatic voltage limiting.

5 Claims, 4 Drawing Figures

INVENTORS H. P. HART
R. J. KAKALEC
R. WALK
BY
*Joseph A. Cameron*
ATTORNEY

OVERVOLTAGE PROTECTION OF DC TO DC CONVERTERS USING FERRORESONANCE

BACKGROUND OF THE INVENTION

This invention relates to inverter circuits having a ferroresonant transformer. More particularly, it relates to such ferroresonant inverter circuits, the output voltage of which is regulated by a voltage to frequency feedback loop.

As electronic circuits and devices have become more complex, the demands upon what was once the simple power supply have kept pace. It is not unusual to require in a single system many different regulated voltages, all held within very close tolerances under widely varying loads, and all produced with high efficiency for low heat dissipation. In addition, since the power supplies themselves usually include semiconductor devices, they must ordinarily be self-protecting in case of a short circuited output.

One method of satisfying these conditions takes advantage of the high efficiency and self-protecting features of the well-known ferroresonant regulator. An inverter drives the ferroresonant regulator to produce an output voltage that is regulated against changes in the input voltage. A feedback loop varies the frequency of the inverter in response to output voltage. Since the output voltage of a ferroresonant regulator is a function of the frequency, the feedback loop is closed, and close regulation of output voltage with both input voltage and load results. Because of the leakage characteristic of the ferroresonant transformer, a short circuit across the output does no harm to either the transformer or the inverter. An example of such a system is disclosed in U.S. Pat. No. 3,590,362 which issued to Robert J. Kakalec June 29, 1971.

When the load supplied by a power system includes intricate and delicate integrated circuits, an additional vital requirement is added to the list of requirements for the power system; the output voltage must not exceed a relatively low maximum even in the event of a power system failure. Even a single voltage spike can destroy the valuable load. In the type power system described, a short circuit in the feedback loop can drive the frequency and therefore the output voltage above a tolerable limit. A separate overvoltage protection circuit has therefore been required.

An object of this invention is to provide at no additional cost, overvoltage protection of a ferroresonant regulated power system.

Another object of this invention is to automatically reduce the output voltage of a ferroresonant regulated power system in the event of a failure in the feedback loop.

SUMMARY OF THE INVENTION

This invention takes advantage of a discontinuity in the frequency characteristic of a ferroresonant regulator circuit. When the frequency is raised to a critical jump frequency, often two or more times the usual operating frequency, the ferroresonant regulator switches to a nonsaturating mode, and the output voltage drops considerably. In a voltage regulating system of the type in which an inverter drives a ferroresonant regulator and the frequency of the inverter is controlled by feedback means in response to the load voltage, the feedback means and inverter are adapted to drive the frequency above the critical jump frequency upon failure of the feedback means. The output voltage is thereby limited to a safe value.

DETAILED DESCRIPTION

Figure 1:
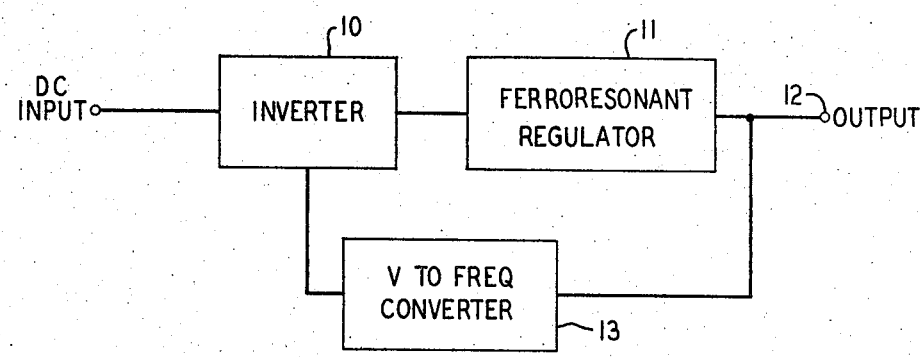
FIG. 1 is a block diagram of a ferroresonant inverter circuit of the prior art, of the type to which this invention may be applied.

FIG. 1 is a simple block diagram of a regulated inverter circuit as described in the Kakalec application previously mentioned. An inverter 10 drives a ferroresonant regulator 11 to produce a regulated output voltage at output terminal 12. To provide closed loop regulation, a voltage to frequency converter 13 senses the voltage at output terminal 12 and varies the frequency of inverter 10 in response thereto. For purposes of this invention, regulator 11 may be connected directly to the output to provide alternating current, or a rectifier may be inserted to provide direct current. If the output is ac, the voltage to frequency converter 13 may include its own rectifier. Furthermore, voltage to frequency converter 13 may include an oscillator to drive inverter 10, or it may include impedances that become part of the frequency determining circuit of inverter 10, as exemplified by the Kakalec application. To provide the negative feedback required for regulation, an increase in output voltage must of course produce a decrease in frequency of inverter 10.

The protection from overvoltage at output terminal 12 that is the subject of this invention depends upon a characteristic of ferroresonant regulators that has previously been unknown or not understood. It has long been known that ferroresonant regulators have a limited frequency range for reliable operation and that even within the range, the output voltage is frequency sensitive. Since the object of a regulator is a constant output voltage, the application of ferroresonant regulators has normally been limited to fixed frequency inputs such as 60 Hertz power lines. The emphasis has been on keeping the input frequency constant, so that the particular frequency characteristic has not been important. We have found, however, that the frequency characteristic of the ferroresonant regulator is predictable, reliable and particularly useful.

Figure 2:
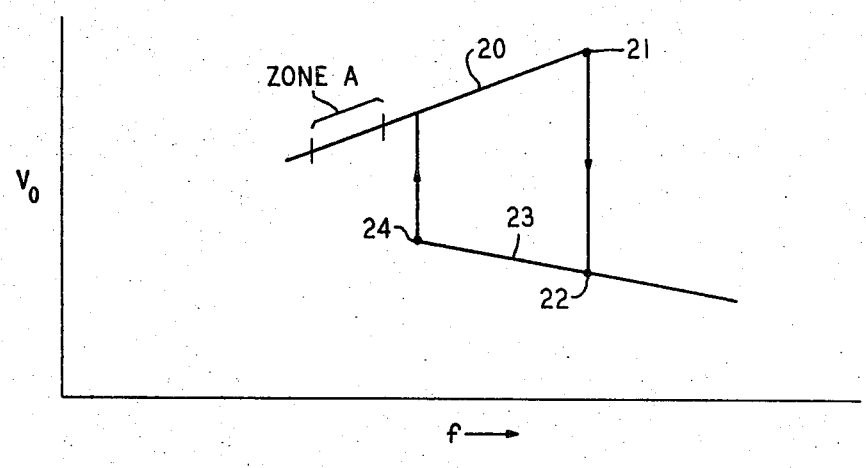
FIG. 2 is a plot of the ferroresonant circuit frequency characteristic that is used in this invention.

This characteristic is illustrated by the curve of FIG. 2. The normal operation of the ferroresonant regulator is described by a line 20 in FIG. 2. In fact, the normal operating range of a ferroresonant regulator is shown as zone A. In this range, voltage and frequency are linearly related; 10 percent increase in frequency is accompanied by approximately 10 to 17 percent increase in output voltage. If the frequency is elevated beyond this range however, it will eventually reach a point 21 at which the voltage suddenly drops a considerable amount to a point 22.

This discontinuity in the output voltage characteristics is caused by a change in the mode of operation. In normal ferroresonant operation, of both the single core and the two-core types, an iron core in the output winding saturates every half cycle of input voltage. When the core saturates, the impedance of the output winding drops to provide a low impedance path for the discharge of the ferrocapacitor that is connected effectively across it. Since the volt-time integral of output winding voltage required to saturate the core is a constant, the ferrocapacitor charges to a constant regulated voltage, provided the driving frequency is constant, in spite of changes in input voltage. When the driving frequency rises so high however, that the core fails to saturate before the input voltage reverses, no low impedance path is provided to reverse the charge on the ferrocapacitor. The voltage generated in the output winding then opposes the capacitor voltage for a portion of the cycle, and a greatly reduced output voltage results. Furthermore, since the ferrocapacitor and the output winding are each effectively connected across the output, the reduced output voltage amounts to a reduced output winding voltage. The reduced output winding voltage would require even longer to saturate the core, and stable operation in a low output mode results.

Once having exceeded the critical frequency at point 21, therefore, the regulator operates in a stable nonsaturating mode along line 23. In this mode, an increase in frequency is accompanied by a decrease in output voltage. In order to return operation to the normal mode, the frequency must be considerably reduced to a point 24, at which the core will again saturate and the output voltage will once again jump up to follow line 20. Operation between these points on curves 20 and 23 is quite stable and reliable.

According to the principles of this invention, the voltage regulating feedback loop of the system is arranged so that a failure that would normally tend to raise the output voltage beyond a safe level will cause the ferroresonant regulator to drop immediately into the nonsaturating mode, hence reducing output voltage. This can be readily illustrated with reference to the dc to dc converter of FIG. 3, which is shown and described in the above-mentioned Kakalec application.

Figure 3:
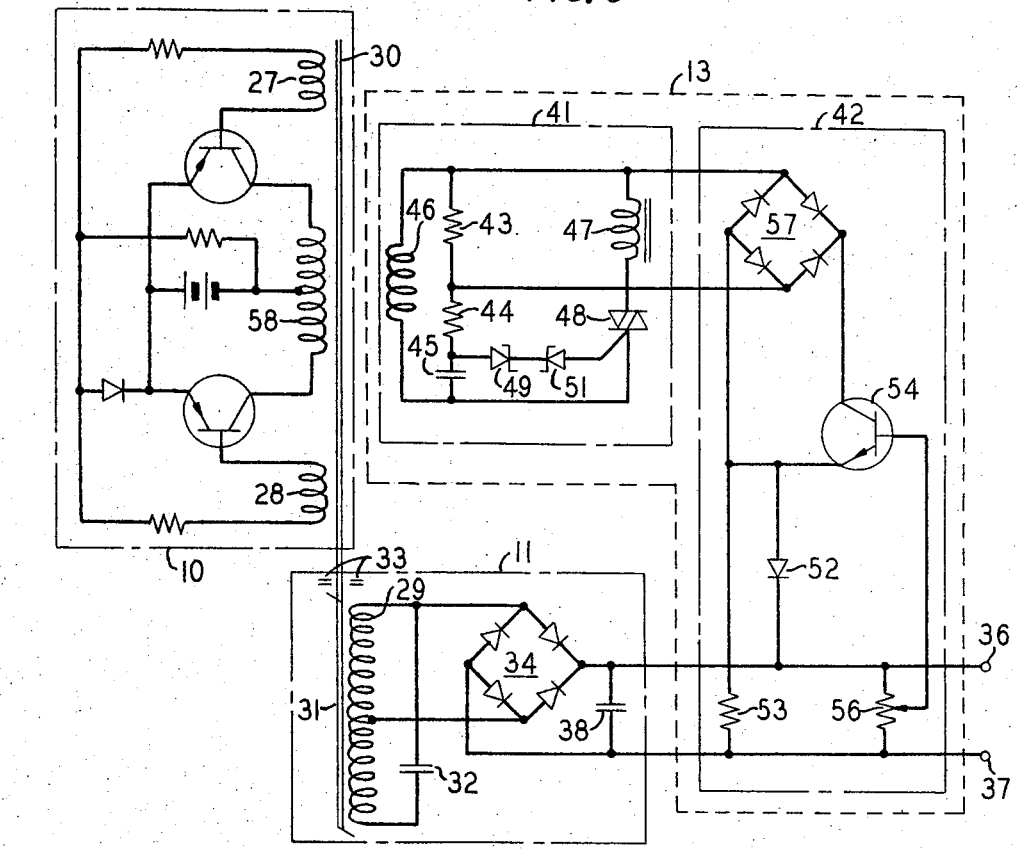
FIG. 3 is a schematic diagram of a ferroresonant inverter circuit that is particularly adapted to use this invention.

The dc to dc converter of FIG. 3 includes an inverter 10, a ferroresonant regulated rectifier 11, and a voltage to frequency converter 13. Inverter 10 is of the well-known push-pull Jensen type that would normally be free running. The drive for each of the transistors is supplied by separate transformer windings 27 and 28. The operation of this type inverter is well known and need not be described here.

Ferroresonant regulated rectifier 11 is also of a well-known type. An output winding 29, wound upon a saturating core portion 31, is shunted by a ferrocapacitor 32. Magnetic shunts 33-33 provide decoupling of core portion 31 from the inverter part 30 of the core to allow saturation of the former without saturating the latter. The ac terminals of a full-wave bridge rectifier 34 are connected across a portion of output winding 29 and the dc output of bridge 34 is connected to a pair of output terminals 36 and 37, respectively. A capacitor 38 may be connected across the output terminals to provide filtering. Core portion 31 saturates every half cycle at a fixed volt-time integral to reverse the voltage on ferrocapacitor 32 in typical ferroresonant regulator operation.

Voltage to frequency converter 13 includes a frequency determining network 41 and an error detector 42. Frequency determining network 41 operates in a manner that simulates saturation of the core of the inverter. An RC integrating network including resistors 43 and 44 and capacitor 45 is connected across secondary winding 46. Also connected across winding 46 is the series combination of an inductor 47 and a triac 48. Paired zener diodes 49 and 51 are connected in series opposition from the gate lead of triac 48 across integrating capacitor 45.

Frequency determining network 41 operates as follows: integrating capacitor 45 charges at a rate that is a function of the volt-time integral of the voltage across secondary winding 46. When capacitor 45 charges to a high enough voltage of either polarity, diode 49 or 51, whichever is at the time back-biased, breaks down to send a pulse of current into the gate of triac 48. The triac thereupon turns ON, switching inductor 47 directly across winding 46. Inductor 47 represents a relatively low impedance, effectively short circuiting winding 46 to simulate saturation of core portion 30, thereby terminating the half cycle of inverter 10 and starting a new half cycle.

The frequency of inverter 10 is therefore determined by the amount of time required for capacitor 45 to reach the breakdown potential of zener diodes 49 and 51. This time is controlled by the zener potential of diodes 49 and 51, the capacitance of capacitor 45, the resistance of resistors 43 and 44 and the voltage across winding 46.

Error detector 42 is applied to control the frequency of inverter 10 by varying the effective resistance of resistor 43. Error detector 42 includes a zener diode 52 connected in series with a biasing resistor 53 across output terminals 36 and 37 to provide a constant reference potential at the emitter of an error detector transistor 54. A potentiometer 56 is also connected across the output terminals, and its tap is connected to the base of error detector transistor 54. The dc terminals of a full-wave bridge rectifier 57 are connected between emitter and collector of transistor 54, and the ac terminals are connected across resistor 43.

If the output voltage tends to increase, the portion of output voltage sensed by the tap on potentiometer 56 increases, causing the base of error detector transistor 54 to become less positive with respect to its emitter. Transistor 54 thereupon becomes less conductive and represents a higher impedance shunt across resistor 43. This in turn has the effect of increasing the time constant of the integrating circuit and therefore increasing the time until triac 48 fires to end the half cycle of inverter 10. The resulting lower frequency drive to ferroresonant regulator 11 reduces the output voltage, opposing the original increase.

When the circuit of FIG. 3 is adapted to provide overvoltage protection according to the principles of the invention, a failure in the feedback network that would cause the output voltage to rise, must drive the frequency of inverter 10 high enough to exceed the critical point 21 of the characteristic of FIG. 2. If transistor 54 fails open, resistor 43 is effectively unshunted, and the frequency of inverter 10 drops to its minimum. The output voltage therefore will not rise. If transistor 54 fails shorted, however, resistor 43 is effectively shorted, and the frequency of inverter 10 rises to its maximum. Contrary to usual design philosophy, which would minimize this increase of frequency, the principles of this invention dictate that in the case of a feedback circuit fault that tends to increase frequency, the increase be great enough to drive the frequency well above the critical frequency of point 21 in FIG. 2. The output voltage is reduced because the ferroresonant regulator is driven into its nonsaturating mode.

The critical jump frequency of any given ferroresonant regulator can be determined by a straight-forward measurement. The frequency of the signal driving the regulator is slowly raised until the sudden jump in output voltage is observed. Since a higher input voltage causes the core to saturate more quickly, it also requires a higher frequency to reach the jump point of nonsaturation. The critical jump frequency should therefore be determined under the conditions of both minimum (low line) and maximum (high line) input voltage.

The feedback loop of the system is then adjusted so that under low line conditions, which produce the lowest jump frequency, full load current can be drawn without exceeding the jump frequency. At the same time, under high line conditions and light load a shorted feedback circuit must drive the frequency above the jump point, which is at its highest under these conditions.

In the case of the circuit of FIG. 3, adjustment of the feedback loop to assure overvoltage protection may be accomplished by the choice of values for resistors 43 and 44. Resistor 44 determines the frequency of operation when resistor 43 is shorted. The value of resistor 44 must be low enough to drive the frequency above the jump frequency at high line and light load. It must, of course, be large enough in value, however, to keep inverter 10 oscillating so that no damage occurs to the inverter. Resistor 43 is chosen so that with both resistors 43 and 44 in the circuit, the frequency at full load and low line will not exceed the jump point. It has been found that ferroresonant regulators designed with a resonant frequency of approximately 15 percent above nominal operating frequency will have a no-load jump frequency approximately two times the no-load operating frequency. At full load, the jump frequency will be considerably less. A frequency increase of three or four times upon feedback-loop failure, therefore, will insure the benefits of this invention. Since they determine the frequency of inverter 10, resistors 43 and 44 also affect output voltage. The number of turns of winding 29 may therefore have to be adjusted to achieve the desired output voltage with a satisfactory value of resistors 43 and 44.

It is important to observe that although one can determine maximum output voltage by slowly raising the frequency or increasing the load through the jump point, the self-protecting feature of this invention does not require that the voltage of the jump point (21 of FIG. 2) actually be reached. When a fault occurs that terminates a single half cycle of regulator input before the core can saturate, the output voltage immediately drops, and the regulator settles into the nonsaturating mode without approaching the voltage of point 21.

Positive protection from overvoltage at the output of a ferroresonant inverter circuit has therefore been obtained according to the principles of this invention without the addition of parts, space or cost.

Figure 4:
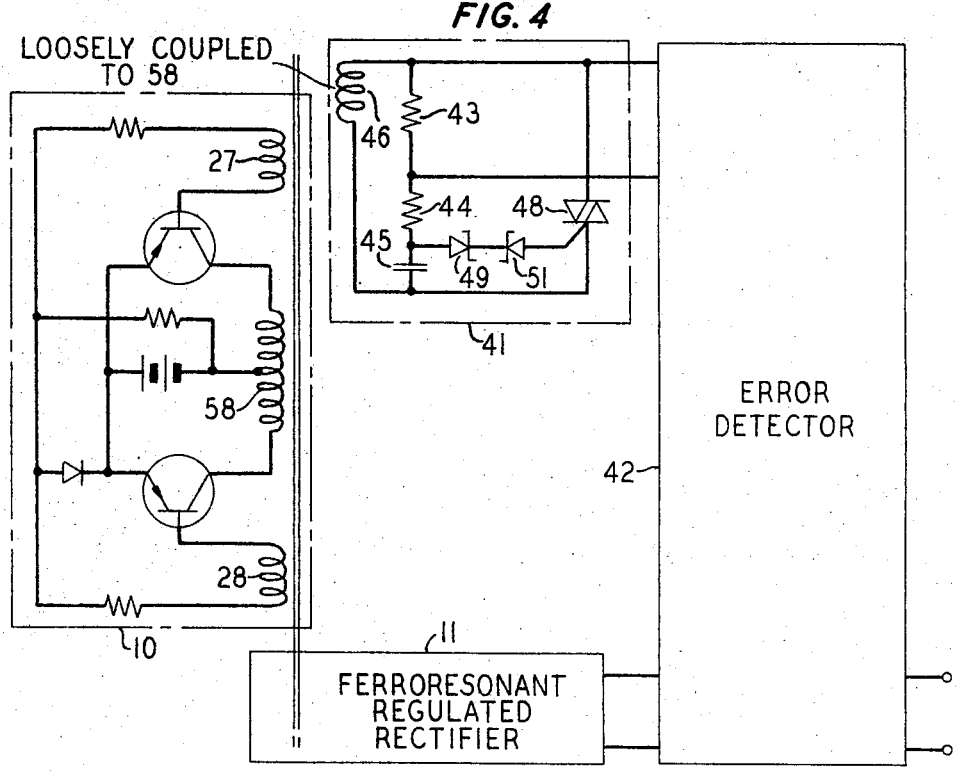
FIG. 4 is a schematic diagram of a useful variation of the ferroresonant inverter circuit of FIG. 3.

An alternative frequency determining network 41, which may be substituted for that shown in FIG. 3, is shown in FIG. 4. This network utilizes the leakage inductance between windings 46 and 58 in place of the separate inductor 47. Triac 48 is connected directly across winding 46 and shorts the winding when fired by the voltage across capacitor 45. According to well-known transformer theory, the short circuit is reflected through the transformer as a short circuit in series with the leakage inductance. In order to simulate a saturated core to the Jensen inverter 10, the leakage inductance must be within the proper range. It has been found that if winding 46 is coupled too tightly to the other core windings 27, 28, or 58, the inverter action is stifled. Magnetic shunts can, of course, be used to isolate winding 46. Alternatively, optimum coupling has been achieved when winding 46 is adjacent to the other windings on the same core leg. This results in a short, sharp pulse of triac current, good inverter action, and high efficiency.

This invention is of course not limited to the circuits of FIGS. 3 and 4. Other systems that operate according to the block diagram of FIG. 1, so that a failure of the feedback loop can cause an unacceptable rise in output voltage, can be adapted to take advantage of these teachings. The operating point of the ferroresonant regulator circuit may be set close to the critical jump frequency, or the feedback loop may be adapted to drive the frequency above the jump frequency when the anticipated failure occurs.

What is claimed is:

1. A self-limiting voltage regulating system for supplying a regulated voltage to a load comprising a source of ac signals of controllable frequency, a ferroresonant regulator having a saturating core, said ferroresonant regulator connected to be driven by said ac signal and to supply said load and feedback means including an amplifier connected between said load and said ac signal source for controlling the frequency of said ac signals in response to the voltage across said load, said feedback means also including means for increasing the frequency of said ac signals higher than will allow said core to saturate when said amplifier is short-circuited.

2. A voltage regulating system as in claim 1 wherein said source of ac signals includes a transformer having a magnetic core and said feedback means includes a winding on said core and an inductor, said inductor being periodically switched across said winding to control the frequency of said signal.

3. A voltage regulating system as in claim 1 wherein said source of ac signals includes a transformer having a magnetic core and said feedback means includes a winding on said core, said winding being periodically shorted to control the frequency of said signal.

4. A voltage regulating system as in claim 1 wherein the short-circuiting of said amplifier at least doubles the frequency of said ac signal.

5. A voltage regulating system for supplying a regulated voltage to a load comprising a ferroresonant regulator having a saturating core and an output winding on said core, said output winding being coupled to said load, a source of ac signals connected to said ferroresonant regulator to drive said core periodically into saturation, and voltage to frequency feedback means connected between said load and said source of ac signals to control the frequency of said signals in response to the voltage across said load, said feedback means including a timing capacitor, a resistance in series with said timing capacitor and a transistor connected across at least a portion of said resistance, said portion being sufficiently large to increase the frequency of said signals higher than will allow said core to saturate when said transistor is shorted, whereby the voltage across said load is limited.

* * * * *